United States Patent [19]

Murakami

[11] Patent Number: 4,869,107

[45] Date of Patent: Sep. 26, 1989

[54] ACCELERATION SENSOR FOR USE IN AUTOMOTIVE VEHICLE

[75] Inventor: Koichi Murakami, Yokosuka, Japan

[73] Assignee: Nissan Motor Co., Ltd., Yokohama, Japan

[21] Appl. No.: 81,383

[22] Filed: Aug. 4, 1987

[30] Foreign Application Priority Data

Aug. 6, 1986 [JP] Japan ........................ 61-183478

[51] Int. Cl.[4] ........................ G01P 15/12

[52] U.S. Cl. ........................ 73/517 R; 338/46; 338/2

[58] Field of Search ........................ 73/517 R, 862.65; 338/2, 3, 5, 46; 357/26, 59 K

[56] References Cited

U.S. PATENT DOCUMENTS

| | | | |
|---|---|---|---|
| 3,266,303 | 8/1966 | Pfann | 73/862.65 |
| 3,572,109 | 3/1971 | Yerman | 73/517 R |
| 3,968,466 | 7/1976 | Nakamura et al. | 357/26 |
| 4,035,823 | 7/1977 | Marshall | 357/26 |
| 4,104,605 | 8/1978 | Boudreaux et al. | 338/5 |
| 4,291,293 | 9/1981 | Yamada et al. | 357/26 |
| 4,522,072 | 6/1985 | Sulouff et al. | 73/517 R |
| 4,553,436 | 11/1985 | Hansson | 73/517 R |

FOREIGN PATENT DOCUMENTS

| | | | |
|---|---|---|---|
| 61-178664 | 8/1986 | Japan | 73/517 R |

OTHER PUBLICATIONS

M. Korner et al., "Integrated Piezo-Resistive Acceleration Pick-Ups", *Acta. Imeko* (1979), pp. 583-590.

L. M. Roylance et al., "A Batch-Fabricated Silicon Accelerometer", IEEE Ed., vol. Ed-26, No. 12, pp. 1911-1917 (Dec. 1979).

*Primary Examiner*—John Chapman

*Attorney, Agent, or Firm*—Foley & Lardner, Schwartz, Jeffery, Schwaab, Mack, Blumenthal & Evans

[57] ABSTRACT

A semi-conductor type accelerometer features the provision of four piezo resistors on the surface of a flexible beam which interconnects the main body portion with a weight or mass which is adapted to cause the beam to flex under the application of an accelerative force. The resistors are subject to essentially the same ambient conditions whereby thermally induced drift is obviated while a high output for a given amount of beam flexure is obtained.

5 Claims, 6 Drawing Sheets

ACCELERATION SENSOR FOR USE IN AUTOMOTIVE VEHICLE

BACKGROUND OF THE INVENTION

1. Field of the Invention

The present invention relates generally to an accelerometer and more specifically to a semi-conductor type accelerometer which is suited for use in vehicular control systems and the like.

2. Description of the Prior Art

FIGS. 1 to 3 show a prior art arrangement disclosed in IEEE ED Vol. Ed-26 No. 12 page 1911 to 1917 (1979). This arrangement includes a G responsive weight or mass 1 which is supported on the main body 2 of a silicon type semi-conductor substrate by a relatively thin flexible beam portion or section 4. Piezo resistors Ra and Rb are formed on the upper surfaces of the beam 4 and main body 2 of the substrate respectively, by doping. Heavily doped regions 6, 8 interconnect the resistors and act as terminals via which they can be connected to other circuitry.

Stepped stopper members 10 (only the lower one is illustrated in FIG. 3) are secured to the upper and lower faces of the main body of the substrate via anodic bonding. These members 10 shield the resistors Ra, Rb from external environmental moisture, strain and the like and further function to support the actual sensor element in a manner which permits the G responsive element 1 to move within acceptable limits in response to the application of accelerative forces.

When an acceleration is applied to the sensor the beam portion flexes so that the surface on which resistor Ra is formed distorts through an angle $\alpha$ (see FIG. 5). Viz., the force (f) applied to the G responsive element can be represented by:

$$f=m\times\alpha \quad (1)$$

wherein m denotes the effective mass of the G responsive element.

White this prior art device it is necessary to construct the associated bridge circuit in a manner as shown in FIG. 4.

The output Vout of this circuit is given by:

$$Vout=(\tfrac{1}{4})\cdot(\alpha R/R)\cdot Vdd \quad (2)$$

wherein:

ΔR denotes the fractional resistance change due to the acceleration;

Vdd denotes the voltage applied across the circuit; and

R=Ra=Rb=Rc (under zero acceleration).

However, this arrangement has suffered from the following drawbacks:

1. Among the four resistors (Ra, Rb, Rc, Rc) only the resistance of Ra changes with acceleration due to the stress induced in the beam portion, and as will be appreciated from equation (2), the variation in the output Vout is only ¼ the change in the resistance of Ra. Hence, the sensitivity of this device is low.

2. As no protecting layer or film is formed on the piezo resistors the reliability and stability thereof is poor;

3. Due to the construction wherein the stopper members are bonded to either side of the substrate on which the measuring electrodes are formed, external temperature has a greater effect on the resistor Rb formed on the main body than on the resistor Ra which is partially insulated due to its disposition on the relatively thin beam section. Thus, with changes in external temperature the resistance values of resistors Ra and Rb tend to become offset and induce the output of the circuit to drift in a manner which reduces the accuracy of the device.

4. During the production of the device an oxide layer 14 is formed on the surface of the silicon substrate (see FIG. 5). However, the expansion coefficients of the substrate and the oxide layer are different and, as shown in FIG. 5, the thermal stress which develops in the beam section of the accelerometer is larger than that in the main body of the substrate. This difference causes a temperature differential between the resistors Ra and Rb and has a detrimental influence on the accuracy of the sensor.

SUMMARY OF THE INVENTION

It is an object of the present invention to provide a semiconductor type accelerometer which features a construction which obviates or offsets the detrimental effects of thermal phenomena and which exhibits a relatively large change in output for a given amount of beam flexure (viz., a high sensitivity).

In brief, the above object is achieved by a semi-conductor type accelerometer featuring the provision of four piezo resistors on the surface of a flexible beam which interconnects the main body portion with a weight or mass adapted to cause the beam to flex under the application of an accelerative force. The resistors are all subject to essentially the same uniform ambient conditions whereby thermally induced drift is obviated while enabling a bridge circuit configuration which produces a high output for a given amount of beam flexure. The preferred embodiments of the invention feature connection arrangements which minimize the variation in thermal stress which is generated in the vicinity of the resistors in a manner which further unifies the environment surrounding the resistors.

An important feature of the embodiments of the invention is that the resistors are formed on a semi-conductive substrate the crystal surface of which is denoted by (100) and the resistors are arranged to extend along crystal axes X,Y.

In more specific terms, the present invention takes the form of an accelerometer comprising: a base member; a mass which is arranged to be movable when subject to an accelerative force; a flexible beam interconnecting the base member and the mass; first, second, third and fourth resistors, the first, second, third and fourth resistors being arranged on a first surface of the flexible beam, the first and third resistors being arranged to be essentially parallel and aligned with a first direction which extends along the length of the beam, the second and fourth resistors being arranged to be essentially parallel and aligned with a second direction which extends across the width of the beam, the first, second, third and fourth resistors being interconnected to defined first, second, third and fourth junctions; and connection lines which establish electrical connection between the first, second, third and fourth junctions in a manner which defines a bridge circuit.

DETAILED DESCRIPTION OF THE PREFERRED EMBODIMENTS

FIGS. 6 to 9 show a less preferred embodiment of the present invention. In this arrangement a "full bridge" circuit arrangement of four resistors (R1, R1, R2, R2) is formed on the surface of the bridge section 104. Two of these resistors R1, R1 are formed in manner to extend laterally across the bridge while the other two R2, R2 are arranged at right angles thereto.

With this arrangement the output of the bridge circuit is given by:

$$Vout=(\alpha R/R)\cdot Vdd \quad (3)$$

wherein:

R=R1=R2 and

ΔR denotes the change in the resistance values.

As will be noted the output of this circuit is considerably higher for a given change in resistance than that used in the above disclosed prior art. Further as all of the resistors are formed in close proximity to one another and also on the relatively insulated beam portion of the device, they are subject to essentially the same environmental or ambient conditions and thus simultaneously undergo essentially the same changes. This tends to obviate external temperature related to output drift. Further, as they are arranged close to one another the variation in doping concentration tends to be reduced as compared with the prior art.

However, while this less preferred embodiment has solved many of the problems encountered with the device illustrated in FIGS. 1 to 5 it has itself encountered drawbacks in that it is necessary to form metallic lead lines 112 (of Aluminium for example) on the surface of the silicon oxide layer 114 after having formed connection holes (no numerals) therein using a photoetching technique. These lead lines 112 extend over the surface of the beam 104 and have a coefficient of expansion which is different from the silicon oxide layer 114. During flexure of the beam these lines induce thermal stress. This problem is enhanced due to the fact that the length of the lines 112 are different and inevitably have minor differences in thickness and width. Accordingly, this arrangement has also suffered from the problems wherein the output of the sensor is at least partially subject to temperature related drift problems which tends to deteriorate the accuracy of the device.

Figure 10:
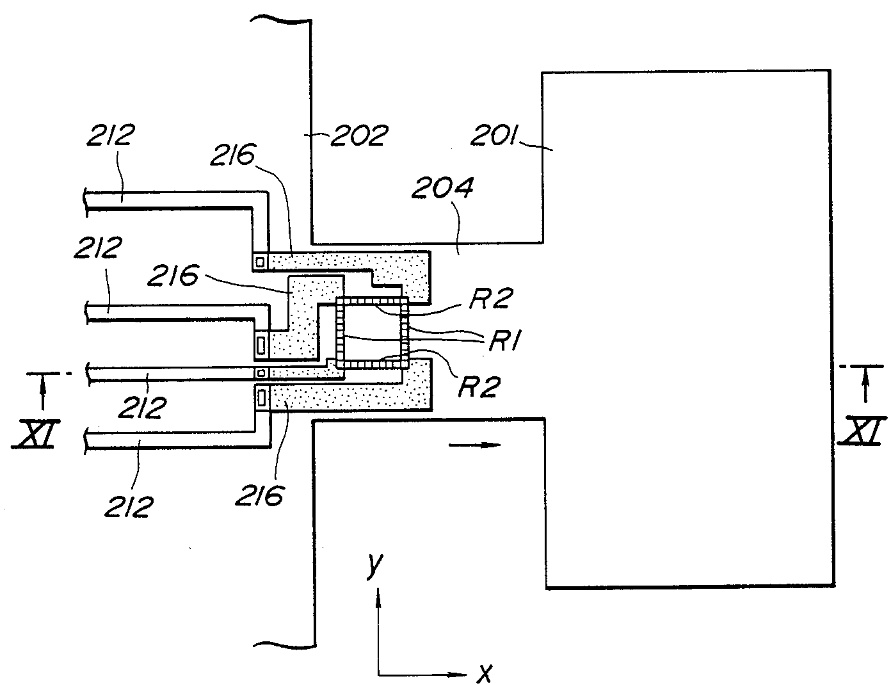
FIGS. 10 and 11 are views showing a first preferred embodiment of the present invention.
Figure 11:
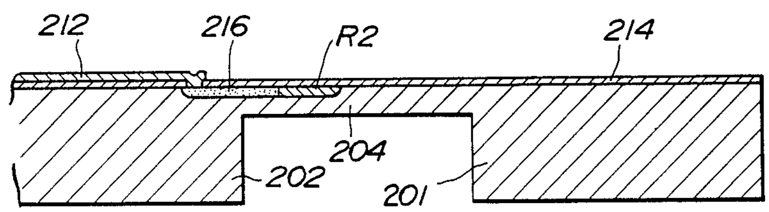

FIGS. 10 and 11 show a first preferred embodiment of the present invention. This arrangement features a full bridge circuit arrangement wherein four resistors are formed on the upper surface of the beam 204 which is integral with and which interconnects the main body 202 and the G responsive element 201. In this arrangement the resistors are formed on a crystal surface (100) and the pairs of parallel resistors arranged to extend along crystal axes X,Y.

The four junctions of the resistors are individually connected with metallic lead lines 212 formed on the upper surface of a silicon oxide layer 214 by heavily doped regions 216 which are patterned on the surface of the silicon substrate and which extend along the top of the beam 204 and which terminate on the main body 202. Connection holes (no numerals) are formed through the silicon oxide layer 214 at points whereat flexure of the beam 204 produces a minimal amount of thermal stress. As best seen in FIG. 11 the metallic lead lines 212 are formed to fill the holes and establish electrical contact with the heavily doped regions 216.

The completed sensor arrangement includes stepped stopper members (neither illustrated) which are secured to the upper and lower faces of the substrate in a manner essentially the same as disclosed hereinbefore in connection with the prior art.

With this arrangement when the G responsive element 201 is subject to accelerative forces which cause the beam 204 to flex, the piezo resistors R2, R2 are subject to considerable stress which causes the resistances thereof to undergo a large change. However, resistors R1, R1 due to their lateral disposition on the beam 204 are not subject to anywhere near the same degree of bending and therefore the resistances thereof do not exhibit large changes.

Figure 1:
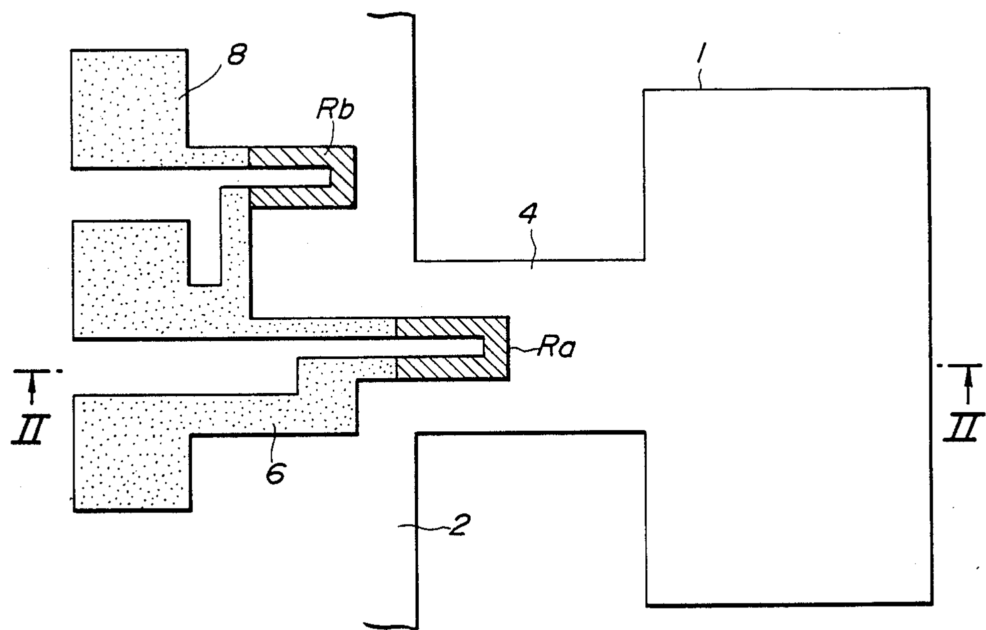
FIG. 1 shows in plan the basic arrangement of the prior art device discussed in the opening paragraphs of the instant disclosure.
Figure 2:
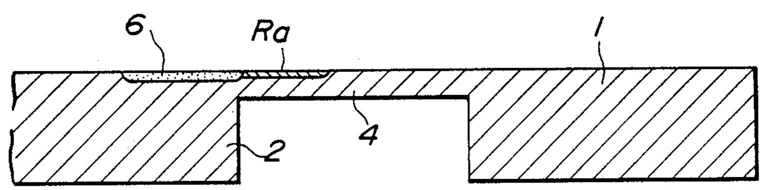
FIG. 2 is a section of the arrangement shown in FIG. 1 as taken along section line II—II.
Figure 3:
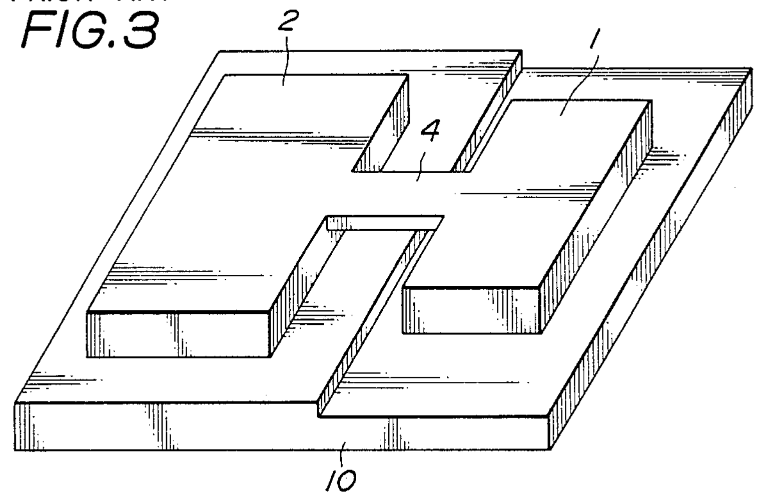
FIG. 3 is a schematic view of the prior art in a partially assembled state.
Figure 4:
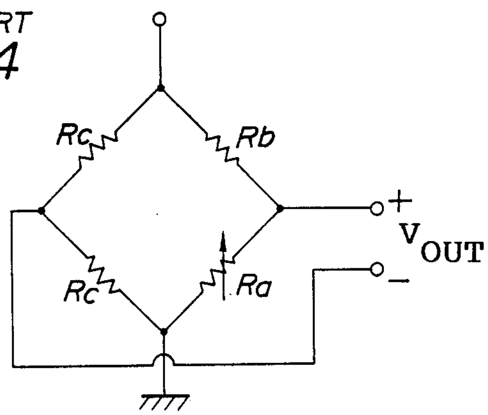
FIG. 4 shows a bridge circuit which results when the resistor arrangement of the prior art device shown in FIGS. 1 to 3, is used.
Figure 5:
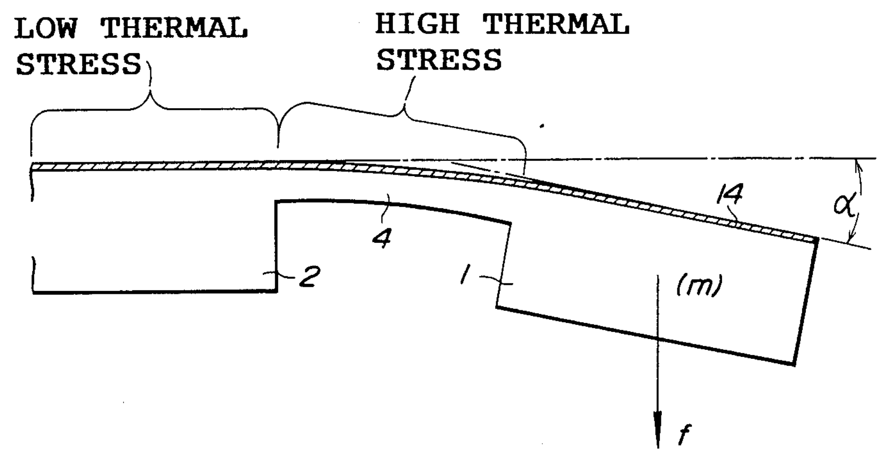
FIG. 5 is a schematic representation of the prior art device showing the zones in which high and low thermal stress tend to occur.
Figure 6:
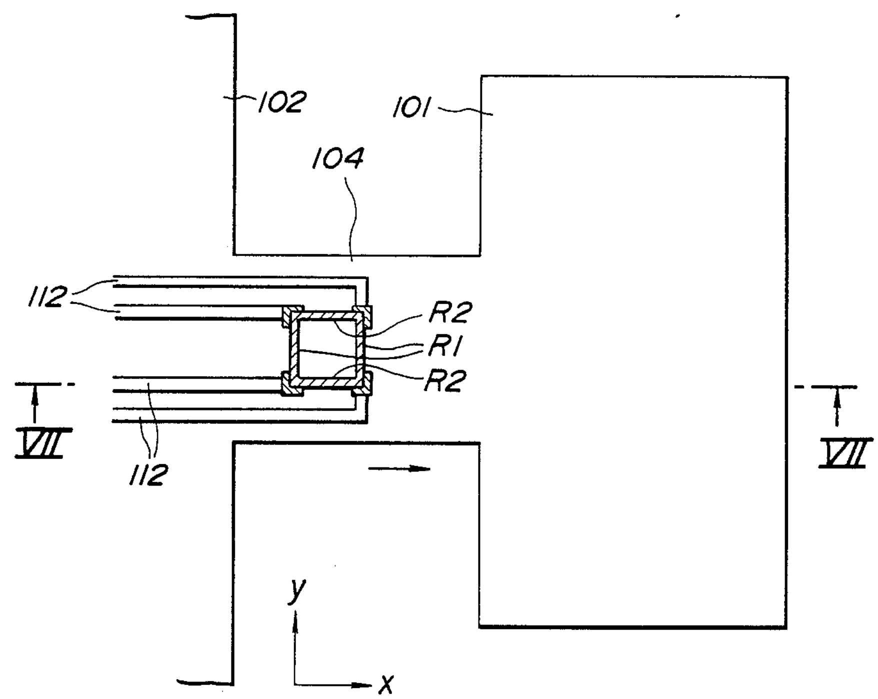
FIG. 6 shows in plan of a less preferred embodiment developed during the research which lead to the present invention.
Figure 7:
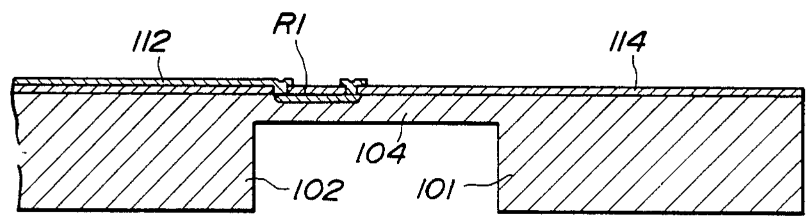
FIG. 7 is a section of the arrangement shown in FIG. 6 as taken along section line VII—VII.
Figure 8:
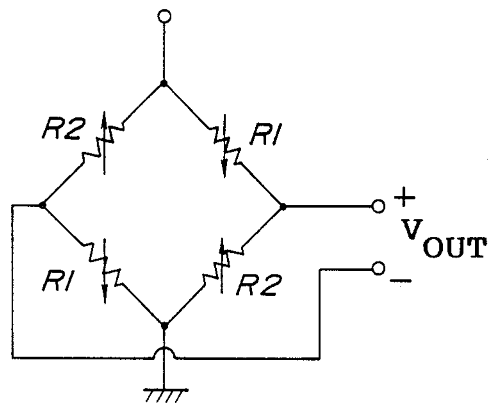
FIG. 8 is a circuit diagram showing a bridge circuit arrangement which is possible with the embodiments of the present invention.
Figure 9:
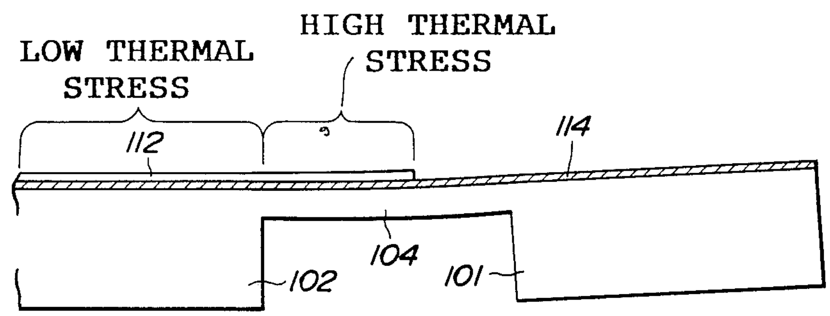
FIG. 9 is a sectional elevation showing the zones in which thermal stress develops with the less preferred embodiment.

The bridge circuit defined by the four resistors is the same as that shown in FIG. 8. Thus, as will be appreciated, as each pair of resistors undergo essentially the same change under the same ambient conditions thermal influences are offset while the voltages appearing on the terminals defined between the pairs of resistors varies in opposite directions. The output of the sensor for a given amount of beam flexure is high. Accordingly the sensitivity of the device is high.

With this embodiment the amount of thermal stress caused by the provision of the metallic electrodes on a section of the device subject to flexure is eliminated and any localized changes in temperature which interfere with the desired operation of the device are eliminated.

Moreover, the disposition of the resistors on the beam is, as in the less preferred arrangement, such as to insulate the same from external temperature effects to essentially the same degree.

In brief, with this embodiment all of the resistors are exposed to essentially the same environmental conditions which offsets any drift in the output due to thermal influences. The use of the heavily doped connections obviates the thermal stress problems encountered with the less preferred embodiment and thus ensures sensor accuracy.

Figure 12:
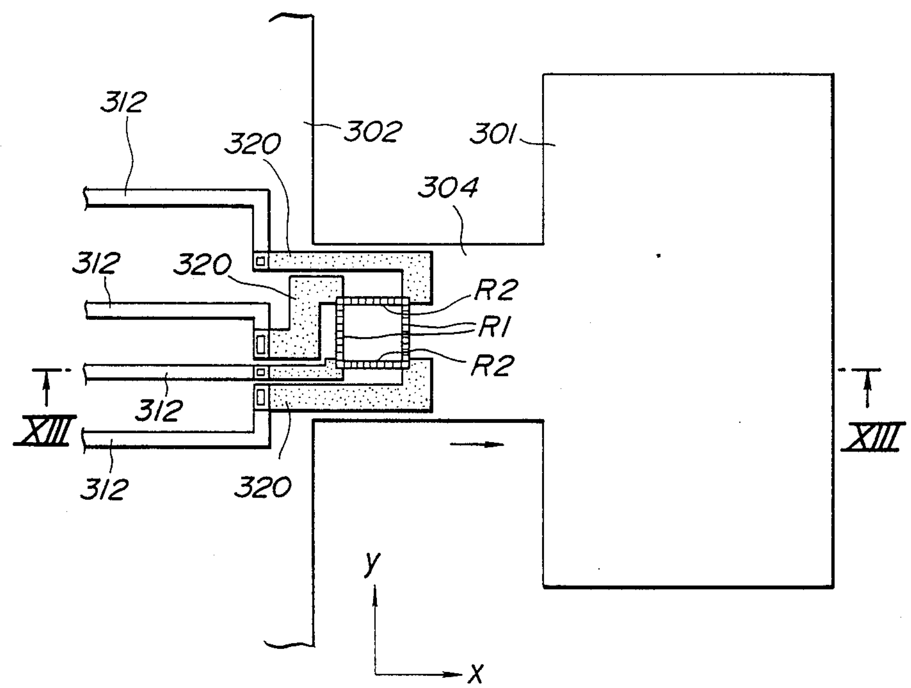
FIGS. 12 and 13 are views showing a second preferred embodiment of the present invention.
Figure 13:
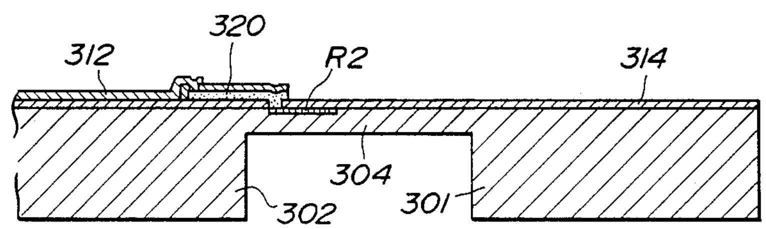

FIGS. 12 and 13 show a second preferred embodiment of the invention. This embodiment is essentially the same as the first one and differs basically in that the heavily doped connection patterns 216 which are formed in the surface of the semi-conductive substrate are replaced with similarly shaped layers or regions 320 of polysilicon. These layers 320 are, as best seen in FIG. 13, formed on the surface of the silicon oxide layer 314 and are in turn themselves covered with a second film of silicon oxide or the like. In this embodiment connection holes are formed through the second oxide layer (no numeral) and metallic connection lines 312 formed to establish connection with the piezo resistors via the polysilicon regions 320.

It will be noted that the expansion coefficients of the polysilicon and the silicon substrate are similar and no particular thermal stress problem is encountered thus enabling the operation to be essentially the same as the arrangement shown in FIGS. 10 and 11.

What is claimed is:

1. An accelerometer comprising:

a base member;

a mass which is arranged to be movable when subject to an accelerative force;

a flexible beam interconnecting said base member and said mass;

first, second, third and fourth resistors, said first, second, third and fourth resistors being arranged on a first surface of said flexible beam, the first and third resistors being arranged to be essentially parallel and aligned with a first direction which extends along the length of the beam, said second and fourth resistors being arranged to be essentially parallel and aligned with a second direction which extends across the width of said beam, said first, second, third and fourth resistors being interconnected so as to define first, second, third and fourth junctions; and connection lines which establish electrical connection between said first, second, third and fourth junctions in a manner which defines a bridge circuit, said base member, said mass member and said beam are formed integrally of a semi-conductive substrate and wherein said first, second, third and fourth resistors are piezo resistors formed by doping the surface of said semi-conductive substrate, said accelerometer further comprising an insulating layer formed over the surface of said semiconductive substrate and said first, second, third and fourth resistors and wherein said connection lines are formed from a selected material which is formed in predetermined patterns on the surface of said insulating layer and at least on said beam, said selected material has a coefficient of expansion which is similar to that of the material of which said semiconductive substrate is made.

2. An accelerometer as claimed in claim 1 wherein said predetermined patterns of said selected material extend from said beam to sites on said base member; and which further comprises electrically conductive lead lines which are formed on the surface of said insulating layer and which are electrically connected to said predetermined patterns at said sites.

3. An accelerometer as claimed in claim 2 further comprising a layer of material formed over the surface of said predetermined patterns and in which connection holes are formed, said electrically conductive lead lines being connected to said patterns through said connection holes.

4. An accelerometer comprising:

a base member;

a mass which is arranged to be movable when subject to an accelerative force;

a flexible beam interconnecting said base member and said mass;

first, second, third and fourth resistors, said first, second, third and fourth resistors being arranged on a first surface of said flexible beam, the first and third resistors being arranged to be essentially parallel and aligned with a first direction which extends along the length of the beam, said second and fourth resistors being arranged to be essentially parallel and aligned with a second direction which extends across the width of said beam, said first, second, third and fourth resistors being interconnected to define first, second, third and fourth junctions; and connection lines which establish electrical connection between said first, second, third and fourth junctions in a manner which defines a bridge circuit, wherein said base member, said mass member and said beam are formed integrally of a semi-conductive substrate and wherein said first, second, third and fourth resistors are piezo resistors formed by doping the surface of said semi-conductive substrate, said accelerometer further comprising an insulating layer formed over the surface of said semiconductive substrate and said first, second, third and fourth resistors and wherein said connection lines are formed from a selected material which is formed in predetermined patterns on the surface of said insulting layer and at least on said beam, and wherein said selected material is polysilicon.

5. An accelerometer comprising:

a base member;

a mass which is arranged to be movable when subject to an accelerative force;

a flexible beam interconnecting said base member and said mass;

first, second third and fourth resistors, said first, second, third and fourth resistors being arranged on a first surface of said flexible beam, the first and third resistors being arranged to be essentially parallel and aligned with a first direction which extends along the length of the beam, said second and fourth resistors being arranged to be essentially parallel and aligned with a second direction which extends across the width of said beam, said first, second, third and fourth resistors being interconnected to defined first, second, third and fourth junctions; and connection lines which establish electrical connection between said first, second, third and fourth junctions in a manner which defines a bridge circuit, said base member, said mass member and said beam are formed integrally of a semi-conductive substrate and wherein said first, second, third and fourth resistors are piezo resistors formed by doping the surface of said semi-conductive substrate, said accelerometer further comprising an insulating layer formed over the surface of said semiconductive substrate and said first, second, third and fourth resistors and wherein said connection lines are formed from a selected material which is formed in predetermined patterns on the surface of said insulating layer and at least on said beam, said selected material has a coefficient of expansion which is similar to that of the material of which said semiconductive substrate is made, said predetermined patterns of said selected material extend from and at least over said beam to sites on said base member, said accelerometer further comprising electrically conductive lead lines which are formed on the surface of said insulating layer and which are electrically connected to said predetermined patterns at said sites.

* * * * *